Sept. 13, 1966    R. R. KNITTEL    3,272,491
RESILIENT SPRING

Filed March 3, 1964    3 Sheets-Sheet 1

INVENTOR.
RICHARD R. KNITTEL
BY
*Walter C. Kehm*
ATTORNEY

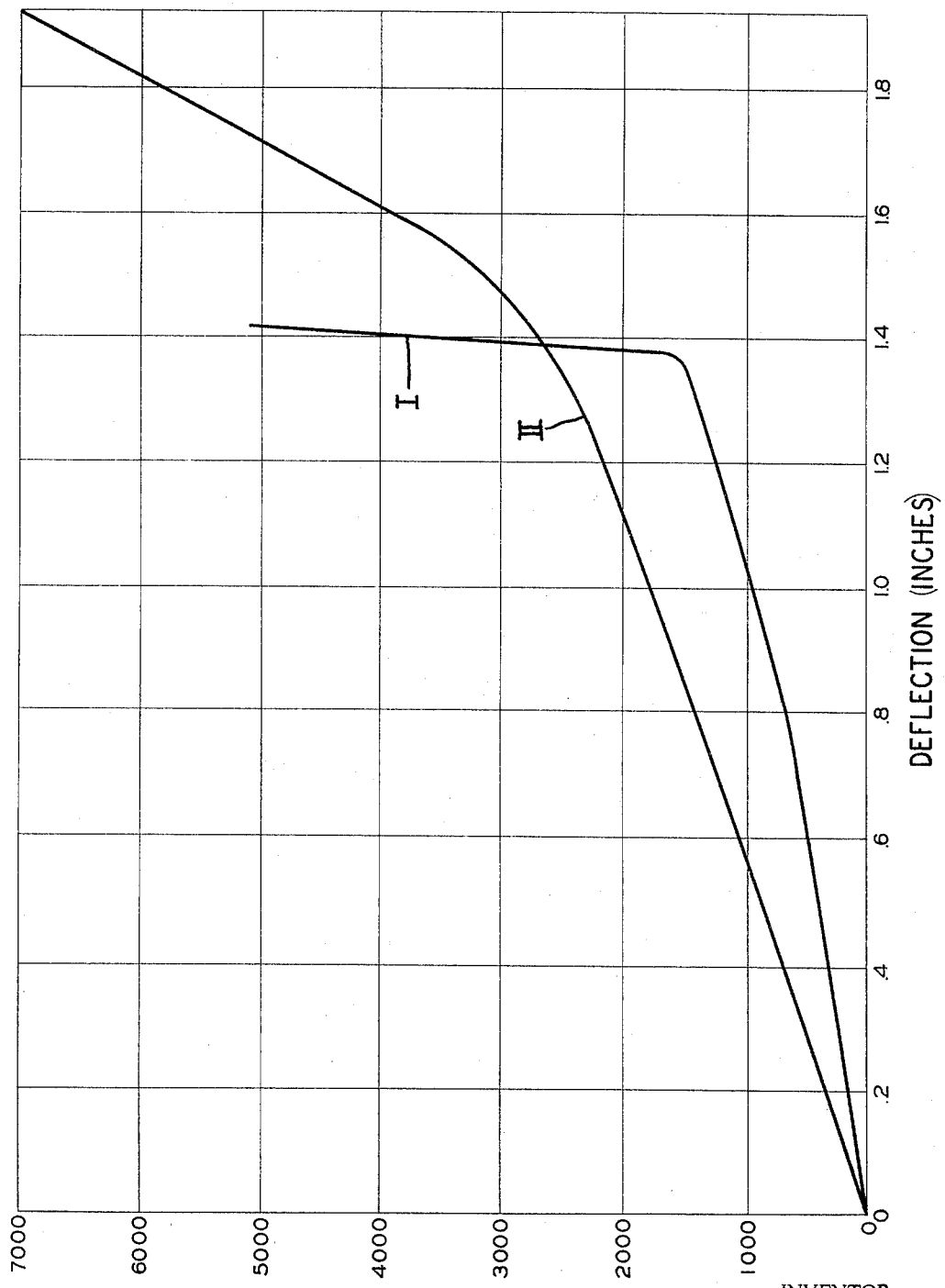

United States Patent Office 3,272,491
Patented Sept. 13, 1966

3,272,491
RESILIENT SPRING
Richard R. Knittel, Martinsville, N.J., assignor to Union Carbide Corporation, a corporation of New York
Filed Mar. 3, 1964, Ser. No. 349,086
5 Claims. (Cl. 267—1)

The invention relates to a resilient spring construction, and more particularly to a spring for use in load supporting devices such as cushions.

In many applications, such as ordinary furniture cushions, springs must be capable of functioning under greatly varying loads such as that exerted by a small child slowly sitting down in a chain as well as that of a large adult quickly sitting down. In the first case, the springs must be "soft" or highly resilient while in the second case, the springs must be "firm" or only moderately resilient, and should neither exhibit a very large amount of deflection nor suddenly stop the motion of the force applied. An excessive length of travel of a spring during compression results in a feeling of insecurity and necessitates the use of springs which have a large total length, while the sudden "bottoming" of a spring produces a harsh, abrupt unpleasant feeling. It should be noted that when a load is rapidly applied to springs, a greater deflection of the springs will occur than that which is produced by the same static load, due to the necessity to absorb the kinetic energy of the moving load. Asthetic as well as functional limitations preclude the use of long springs in many applications, while comfort limitations require springs to be able to gently stop the motion of large forces without excessive deflection and also be able to softly cushion small loads.

A spring should, therefore, be initially soft and terminally stiff while having a high ratio of total deflection to total length. The terminal stiffness should be a gradually increasing stiffness characterized by gradually decreasing increments of deflection per unit of increasing load, in order to exhibit the optimum bottoming characteristics under maximum loads and consequently increase useful range of the spring.

A further problem arises from the fact that in repeated usage springs take on permanent set, that is, fail to return to their normal uncompressed length after the removal of the compressive load and also tend to crack in areas of maximum stress.

Repeated flexure about a single point, such as is seen in a conventional sharp apexed, bellows springs, must be avoided in order to minimize the aforementioned problems. While helically wound coils and bellows having S shaped cross-sections serve to distribute the flexure along the length of the spring, these spring configurations have several undesirable limitations. For example, the coil configuration has only limited applicability in the field or plastics because of inadequate strength characteristics and coil spring assemblies are complex in structure, while the S shaped bellows configuration tends to yield an undesirably low ratio of total deflection to spring length.

In the field of furniture cushioning, it has been found that bellows type spring assemblies can achieve improved design, strength, comfort, stability and economy over conventional types of cushioning structures.

While vented bellows springs can simultaneously improve stability and simplicity of construction, and provide proper breathing, variable firmness in selected zones of the article, inexpensive construction and durability, the vented bellows springs exhibit some of the undesirable characteristics normally found in springs, such as abrupt or hard "bottoming," permanent-set, fatigue or cracking at the sharp bellows junctures and a low ratio of total deflection to total height.

It is possible to employ, in series, a plurality of springs which have different spring constants in order to produce a composite spring with a varying spring constant. The foregoing solution normally increases spring length, the complexity of construction, and consequently increases manufacturing costs.

Special spring configurations, such as seen in British Patent 886,295, have been employed in order to produce a spring with a variable spring constant. These type of springs have found limited utility because of several drawbacks, such as, a low ratio of total possible deflection to total spring length, complexity of manufacture and high cost, and a failure to produce a "spongy" bottoming with maximum loads. As seen in FIGURE 4 of the British patent, the springs usually merely provide a single high, terminal spring constant rather than a gradually increasing terminal spring constant. These springs rely upon the final compression of the spring material itself, in order to provide the variation in the spring constant. Since the walls of these springs must be thick in order to yield a significant amount of terminal compression, the total deflection of the spring, on comparison to its length, must be low. Moreover, the terminal spring constant is limited to the spring constant of the material of the spring.

It is, therefore, an object of the present invention to provide a resilient load support device which has a gradual, spongy, "bottoming" action under maximum load.

It is another object of the present invention to provide a resilient load support device which has a high ratio of total deflection to total length of spring.

Another object of the present invention is to provide a resilient load support device capable of repeated compression without significant permanent set resulting therefrom.

It is a further object of the present invention to provide a resilient load support device which is simple in construction and lends itself to low cost production.

According to the present invention a resilient spring is provided which comprises an undulating member having leg sections and juncture sections between adjacent leg sections. The junctures have alternate rounded and sharp configurations. Advantageously, the cross-sectional thickness is at least at the rounded, arcuate junctures and greatest at the sharp junctures, with the thickness of the leg sections decreasing uniformly from the sharp juncture to the arcuate juncture.

The hinging action of the arcuate juncture takes place over the length of the juncture thus distributing the points of flexure and substantially negating permanent-set and fatigue cracking. The sharp, thick junctures permit high ratios of total deflection to spring length and provide a soft, spongy bottoming action.

The spring can, advantageously, be in the form of a bellows device, wherein the arcuate junctures are the outer junctures of the bellows, and the sharp junctures are the inner junctures of the bellows.

Other objects and advantages of the invention will be appreciated and the invention will be better understood from the following specification wherein the invention is described by reference to the embodiments illustrated by the accompanying drawings wherein:

FIGURE 3 is a graph comparing the deflection characteristics of two types of springs.

Figure 1:
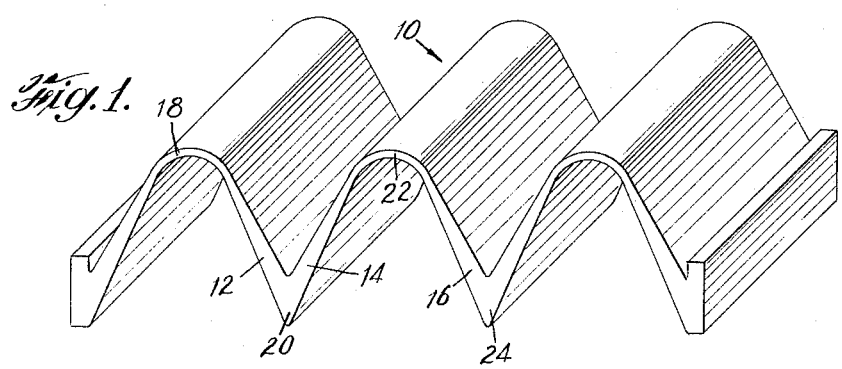
FIGURE 1 is a perspective view of a spring according to the present invention.

The spring as seen in FIGURE 1, consists basically of a resilient, undulating member 10, which has a series of leg sections 12, 14 and 16 and a series of junctures 18, 20, 22 and 24 between adjacent legs.

Resilient materials such as resilient polymeric materials in general may be employed for the springs. While polyolefins such as polypropylene or some other equivalent polymer such as an ethylene-ethyl acrylate copolymer or a butadiene polymer give good results, low density polyethylene exhibits only slight permanent set while providing adequate strength and resiliency and is, therefore, preferred.

Figure 2:
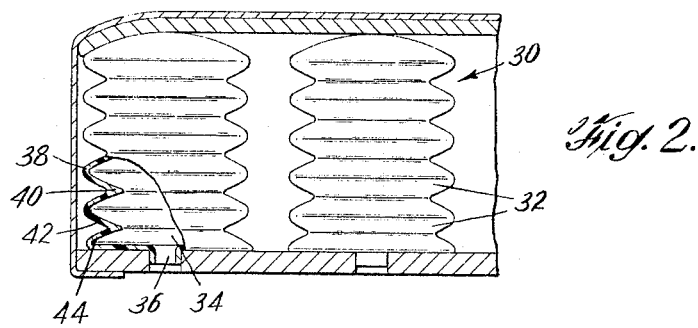
FIGURE 2 is a fragmentary side elevation, partly in section, of a modification of a spring structure.

The undulating member 10, can be formed from a sheet of polymeric material, by processes such as vacuum forming, compression molding and the like. The member is preferably in the form of a tubular, bellows structure 30, as shown in FIGURE 2, which can be employed in most applications suited to tubular springs such as in various forms of shock absorbers, squeeze-type dispensing bottles, furniture cushions and the like.

The blow-molding process is preferred for the production of bellows springs, because of the low cost of the mold, the rapidity and accuracy of the process in reproducing springs of identical characteristics. Also springs of varying wall thickness can be formed with the same mold. This process is preferred also because of the desirable physical characteristics of the polymeric wall resulting from the polymer being forced radially into the mold during the blow molding operation.

The bellows spring 30 has a hollow undulated wall formed of series of adjacent interconnected individual bellows 32. The internal chamber 34, defined by the integrally interconnected individual bellows is freely vented to the atmosphere through suitable vent openings 36 formed in the spring.

The wall of the outer peripheral extremities 38 of the individual bellows are thinner than the inner extremities 40, with the change in thickness being gradual over the legs. These arcuate, rounded outer extremities 38 have the least resistance to flexing and, therefore, comprise unique hinges which flex controllably over the entire arcuate surface. Each flexible outer hinge is integral with and joins the radially outwardly converging legs 42 and 44 of each individual bellows 32 and is formed by the arcuate portion 38 extending from one leg 42 to the other 44.

Almost the entire deflection of each spring, is a result of the flexure of the outer flexible juncture hinges 38 with only slight flexing occurring in the legs 42 and 44 during spring compression under load. The flexing characteristics of the outer junctures depend upon the thickness of the junctures as well as the materials and the arcuate configuration thereof.

The thicker walled, inner junctures 40 constitute the most rigid portion of the bellows construction. Therefore, when each spring is compressed, the inner junctures 40 flex only after the outer junctures 38 have flexed considerably. This creates a unique double-action, since the initial compression or partial deflection of the spring is "soft," and occurs readily under a relatively light load, with flexure of the outer, thin, arcuate hinges 38. This is followed by a second partial depression, due to flexure about the inner junctures 40, but only under a substantially greater load. This effect creates good comfort, without abrupt bottoming.

In the normal uncompressed state, the angle between the legs 42 and 44 of each bellow should be greater than an angle of about 50° minimum in order to obtain a proper blow-molded hinge. If the bellows angle is significantly less than this, the wall thickness of the outer arcuate hinge tends to be too thin because of the difficulty of forcing the polymer into the corresponding mold cavities. Thus, it is too weak to supply its share of support. Also, the bellows tends to have an insufficient range of flexure, since the total flexure of each bellows is determined largely by the initial angle of separation of its legs. The combination of these two factors detrimentally lessens the spring support below a useful amount. However, it has been found that if the angle is about 50° or greater, when using the ordinary sharp apex on the outer juncture, the fiber stress in the plastic of the outer hinge becomes so great that a permanent set results.

It has been found that the novel arcuate outer hinge configuration enables these large angles to be employed, without the occurrence of significant permanent set. This is believed to be because the flexing action occurs over the entire arcuate area rather than at a concentrated sharp apex. Whatever the technical explanation happens to be, the fact remains that those two normally incompatible, and very important characteristics are thus made completely compatible, thereby making bellows springs extremely useful.

This arcuate configuration has been found to be advantageous for other reasons also. This feature, coupled with others, causes the springs to have a "spongy" rather than an abrupt bottoming action under maximum compression. The resistance to compression increases with increasing lead, and just prior to maximum compression, the resistance increases generally exponentially, i.e., the increase is rapid, but still at a rate, instead of instantaneously, so that a certain springiness remains even at the point of bottoming rather than a harsh, abrupt, unpleasant halt.

While each of the bellows springs is shown to be generally circular in configuration, each can also conceivably be of polygonal cross-sectional configuration.

In a cushion employing a plurality of springs, the cushioning effect or resistance to compression in different zones can be varied in by inserting springs of different wall thickness. This thickness is varied by altering the amount of material in the unblown parison introduced into the mold cavity, by varying the parison wall thickness or the parison diameter, or both. Actually, the resistance to flexing by the wall is proportional to the cube of the wall thickness. Thus, by doubling the thickness, for example, the resistance to compression is increased by 8 times. This is controlled for each bellows in accordance with the following relationship:

$$\frac{P}{Y \text{ max.}} = \frac{E(\pi)(D+d)t^3 \text{ av.}}{(D-d)^3}$$

where

P—Load or weight on spring (pounds).
Y max.—Deflection at inner juncture (inches).
E—Flexural modulus of polymer.
D—Diameter at outer juncture (hinge arc) (inches).
d—Diameter at inner juncture (inches).
t av.—Average thickness of material in a bellows leg.

When this equation is applied to a bellows having sharp apex type junctures, D is the outer juncture and d is the inner juncture. However, when applied to a bellows having arcuate junctures and intermeshed with a bellow of an adjacent spring, D is still the largest diameter of the outer arcuate juncture or hinge arc, but d becomes the diameter of the inner limit or point to tangency of the hinge arc with the legs 28 and 30 of the bellows.

*Example 1*

A spring weighing about 21.04 grams and 3.31 inches long was blow molded from low density polyethylene. The spring had a 1.19 inch outer diameter, and a 1.125 inch inner diameter and included 12 sharp apex bellows units. The angle between the legs of the bellows was approximatel 31°. The spring was subjected to increasing loads and the resultant deflection was measured as follows:

| Load (grams): | Deflection (inches) |
|---|---|
| 200 | 0.25 |
| 400 | .50 |
| 600 | .75 |
| 800 | .810 |
| 1300 | 1.060 |
| 1200 | 1.19 |
| 1400 | 1.312 |
| 1600 | 1.375 |
| 2800 | 1.375 |
| 4000 | 1.375 |
| 5000 | 1.44 |
| 6000 | 1.44 |

*Example 2*

A spring having a bellows construction such as seen in FIGURE 2 weighing about 17.38 grams, and 3.19 inches in length was blow molded from low density polyethylene.

The spring had a 1.19 inch outer diameter, a 1.125 inch inner diameter and included 6 bellows units. The angle between the legs of the bellows was approximately 31°. The outer juncture had a radius of curvature of ¼ of an inch and was a 160° arc. The spring was subjected to increasing loads and the resultant deflection was measured as follows:

| Load (grams): | Deflection (inches) |
|---|---|
| 200 | 0.120 |
| 400 | 0.25 |
| 600 | 0.37 |
| 800 | 0.44 |
| 1000 | 0.56 |
| 1200 | 0.69 |
| 1400 | 0.75 |
| 1600 | 0.94 |
| 1800 | 1.0 |
| 2000 | 1.12 |
| 2100 | 1.25 |
| 2400 | 1.31 |
| 2600 | 1.37 |
| 2800 | 1.44 |
| 3000 | 1.56 |
| 4000 | 1.56 |
| 5000 | 1.69 |
| 6000 | 1.87 |
| 7000 | 1.94 |

The deflection curves for the springs of Example 1 (both apices sharp) and Example 2 (alternate round and sharp apices) are plotted in FIGURE 3.

The large difference in the strength (load carrying capacity) and in the spring constant between the two types of springs, is probably principally attributable to the increased strength of the outer junctures. It is difficult to get plastic to flow to the outermost point of the sharp apex, during the blow molding operation and there can be, therefore, excessive thinning at the outermost point of the apex.

While increasing the angle between the bellows legs will permit an increased flow of plastic to the outer apex, the angular movement at each apex, during compression and consequently the degree of permanent set and fatigue cracking will also be increased.

Other variations, such as increased uniformity in the apex and leg cross-sections or increased spring weights produce undesirable corresponding changes such as abrupter bottoming, decreased deflection and increased permanent set.

It is thus seen that springs having sharp apices cannot yield the combination of low permanent set, high deflection and soft bottoming obtainable with the spring of Example 2.

Figure 5:
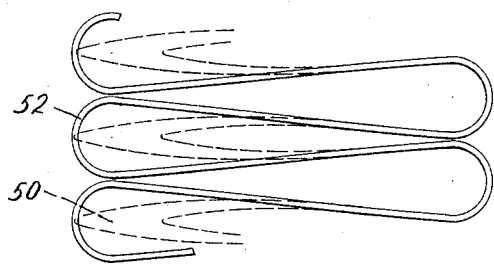
FIGURE 5 is a schematic comparison of two partly compressed springs.

As seen from FIGURE 5, springs 52 having round apices cannot yield the desirable compression characteristics of the alternate sharp-round apex spring 50, represented by dashed lines. The spring 50 is seen to still be in an initial stage of compression when the corresponding spring 52 has reached the bottoming stage. The use of fewer bellows in the same total length spring 52 would serve to prolong the initial compression period, but only at a sacrifice in permanent set resistance.

Other modifications of spring 52, as for example, providing apices having alternate thick and thin cross-sections will produce an undesired increase in the abruptness of bottoming and a decrease in total possible deflection.

It is thus seen that the use of a spring in which both inner and outer apices that are rounded cannot yield the combination of low permanent set, high deflection and high load carrying capacity obtainable with the spring of Example 2.

Figure 4:
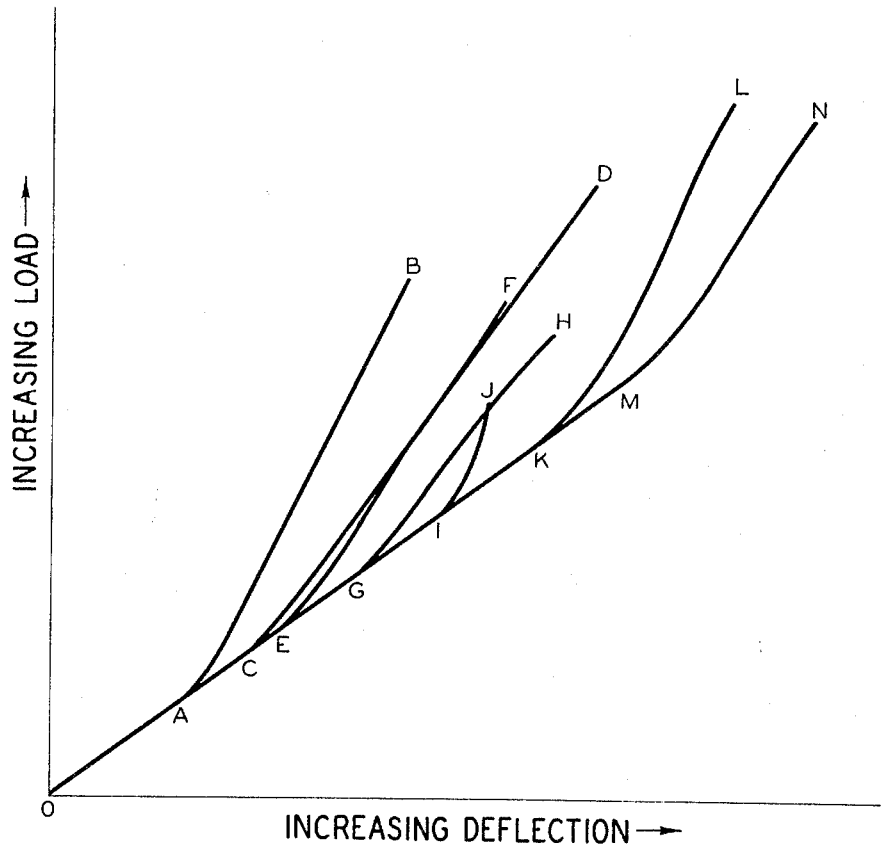
FIGURE 4 is a graph, comparing the deflection characterisics of several types of springs.

The curves of FIGURE 4, compare typical spring constants of various bellows springs which are designed to have a desired initial spring constant and which have substantially equal dimensions, but which differ in their cross-sectional configurations.

A spring which has uniform wall thickness and sharp apices will have a substantially consistent spring constant indicated by line O–I–J, and will exhibit no appreciable terminal change (I–J) in its spring constant. Providing the aforementioned spring with alternate thick and thin junctures could produce some improvement in the way of providing a two phase system as indicated by line O–E–F, but the amount of deflection in the first phase, line O–E, is inadequate.

As previously noted, decreasing the number of bellows used, by increasing the angle between bellows, in order to increase the total possible deflection, would increase the problem of permanent set and stress cracking which is already severe in sharp apex springs.

A spring having arcuate junctures provides improved bottoming indicated by line O–G–H, over springs with sharp apices, but exhibits a limited amount of deflection. The bottoming will begin at about the time the spring is compressed to the position in which adjacent arcuate apices are in contact as seen for example, in FIGURE 5, spring 52.

Providing the arcuate apex spring with alternate thick and thin arcuate junctures would improve the softness of bottoming (line C–D) and would probably improve the load carrying capacity, but only at a sacrifice in the initial phase of compression as represented by the change from line O–G to line O–C.

The use of alternate thick arcuate apices and thin sharp apices would produce a spring which has a second phase of compression, as represented by line A–B, which resembles that of an alternate thick and thin arcuate apex spring (line O–C–D) but would yield an even smaller initial phase of compression (line O–A).

As shown by line O–K–L, the use of alternate sharp and arcuate apices provides a high degree of total possible compression by permitting a complete compression of the arcuate apex as shown by the compression of springs 52, of FIGURE 5. The spring combines a substantial initial compression, indicated by line O–K, with a soft bottoming stage, indicated by line K–L.

The initial compression stage of an alternate sharp-arcuate spring is further extended (line O–M) and the bottoming stage becomes more gradual (line M–N), when the sharp apex is thick, relative to the arcuate juncture.

The characteristics of various springs are set forth in the following chart.

|  | Spring Characteristics | | |
| --- | --- | --- | --- |
| Spring Type | Deflection Until Bottoming Region | Resistance to Permanent Set | Bottoming |
| I........ Sharp Apices, Uniform Cross-Section. | Moderate............ | Poor................ | Poor. |
| II....... Sharp Apices, Alternate Thick and Thin Cross Sections. | .....do............. | .....do............. | Do. |
| III...... Rounded Apices, Uniform Cross-Section. | Poor................ | Moderate............ | Moderate. |
| IV...... Rounded Apices, Alternate Thick and Thin Cross-Sections. | .....do............. | Good................ | Poor. |
| V....... Spring I or II in Series with Spring III. | Moderately Poor.... | Moderately Poor.... | Moderately Poor. |
| VI...... Spring I or II in Series with Spring IV. | Poor................ | Moderate............ | Poor. |
| VII..... Alternate Round and Sharp Apices. Uniform Cross-Section. | Moderate............ | .....do............. | Do. |
| VIII.... Alternate Round and Sharp Apices. Round Apices have thin cross-sections and sharp apices have thick cross-sections. | Good................ | Good................ | Good. |

Sharp apex springs require a large number of bellows, and therefore, exhibit poor deflection characterics while the repeated flexure about a single point in these springs creates severe permanent set problems. The use of alternate thick and thin junctures improves the bottoming characteristics of sharp apex springs, but is inadequate to overcome abrupt bottoming.

The use of round junctures permits improved strength characteristics, as previously noted and, therefore, permits the use of fewer bellows and consequently provides an improvement in the deflection characteristics. The use of alternate thick and thin round apices improves the permanent set characteristics by preventing the collapsing of the round apices under heavy loads, and their consequent functioning in the manner of sharp apices. The thick junctures, however, severely limits the deflection of the spring and increase the abruptness of bottoming.

The use of a combination of the foregoing springs, in series, merely provides a net result which is the average of each spring acting independently.

The use of alternate sharp and round apices greatly improves deflection characteristics but at a sacrifice in permanent set, as compared to springs with only rounded apices. By employing a thick, sharp apex, in combination with a thin rounded apex the deflection of the sharp apex is transferred from a single point to the point along the legs thus substantially improving the permanent set properties without a significant loss in deflection. The bottoming characteristics of the spring is very greatly enhanced, probably because of an enhanced functioning of the thick apex and the tapering legs when they cooperate with round apices.

It is seen from the foregoing that even apparently minor changes in the configuration of a spring can produce substantial changes in the functioning of the spring.

The use of alternate sharp-arcuate junctures is seen, from the foregoing, to be capable of producing springs which have bottoming, total deflection, load capacity and permanent set characteristics which are all superior to those of both the sharp and the arcuate apexed springs. More specifically, the alternate sharp-arcuate spring permits greater deflection than available in either sharp or arcuate springs without sacrificing either permanent set or capacity.

Although the invention has been described in its preferred forms with a certain degree of particularity, it is understood that the present disclosure of the preferred forms has been made only by way of example, and that numerous changes in the details of construction and the combination and arrangements of parts may be resorted to without departing from the spirit and the scope of the invention.

What is claimed is:
1. A spring comprising an undulating member having resilient leg sections and resilient juncture sections between adjacent leg sections, the junctures having alternating rounded, arcuate configurations and sharp configurations, said rounded configurations having the arc extending over a substantial portion of the convolution, the cross sectional area of the member at the sharp configuration being substantially greater than the cross-sectional area of the member at the rounded juncture, said leg sections being substantially straight and inclined and the cross-sectional area of the leg sections decreasing uniformly over their length from thick, sharp juncture, to the thin rounded juncture.

2. The spring as defined in claim 1, wherein each of said leg sections are at an angle with respect to each other of at least about 50°.

3. A resilient vented bellows spring comprising, a series of integrally connected bellows forming the resilient support of said spring, each bellows having a pair of outwardly converging legs with an integral hinge at the outer juncture thereof said leg sections being substantially straight and inclined, the outer junctures having a rounded arcuate configuration and serving as a hinge, said rounded configurations having the arc extending over a substantial portion of the convolution, wherein the hinging action occurs over the length of the arcuate juncture.

4. The spring as defined in claim 3, wherein said legs of each bellows are at an angle with respect to each other of at least about 50°.

5. The spring as defined in claim 3, wherein each of said arcuate junctures has a wall thickness less than the wall thickness at the inner junctures of the legs of adjacent bellows.

References Cited by the Examiner

UNITED STATES PATENTS

| 2,536,626 | 1/1951 | Coleman. | |
| 2,633,811 | 4/1953 | Poage | 267—35 X |
| 3,201,111 | 8/1965 | Afton | 267—1 |

FOREIGN PATENTS

| 230,754 | 12/1963 | Austria. |
| 531,245 | 7/1955 | Italy. |

References Cited by the Applicant

UNITED STATES PATENTS

| 2,150,747 | 3/1939 | Naulty. |
| 2,350,711 | 6/1944 | Amos. |
| 2,821,244 | 1/1958 | Beck. |
| 3,083,877 | 4/1963 | Gash. |

FOREIGN PATENTS

| 886,295 | 1/1962 | Great Britain. |

ARTHUR L. LA POINT, *Primary Examiner.*

W. B. WILBER, R. M. WOHLFARTH,
*Assistant Examiners.*